US011858467B2

(12) United States Patent
Nakaoka

(10) Patent No.: US 11,858,467 B2
(45) Date of Patent: Jan. 2, 2024

(54) UTILITY VEHICLE

(71) Applicant: Kubota Corporation, Osaka (JP)

(72) Inventor: Yuki Nakaoka, Sakai (JP)

(73) Assignee: Kubota Corporation, Osaka (JP)

(*) Notice: Subject to any disclaimer, the term of this patent is extended or adjusted under 35 U.S.C. 154(b) by 0 days.

(21) Appl. No.: 17/826,041

(22) Filed: May 26, 2022

(65) Prior Publication Data

US 2023/0114092 A1 Apr. 13, 2023

(30) Foreign Application Priority Data

Sep. 27, 2021 (JP) ................. 2021-156919

(51) Int. Cl.
B60R 7/06 (2006.01)
B60K 37/04 (2006.01)

(52) U.S. Cl.
CPC ............... B60R 7/06 (2013.01); B60K 37/04 (2013.01); B60K 2370/46 (2019.05); B60K 2370/61 (2019.05); B60Y 2200/20 (2013.01)

(58) Field of Classification Search
CPC ... B60R 7/06; B60R 16/03; B60R 2011/0005; B60K 37/04; B60K 2370/46; B60K 2370/61; B60Y 2200/20
USPC ........................................ 296/37.12
See application file for complete search history.

(56) References Cited

U.S. PATENT DOCUMENTS

| 4,726,789 | A | * | 2/1988 | Yaffe | ............... | B60R 11/0205 |
| | | | | | | 439/627 |
| 8,562,056 | B2 | * | 10/2013 | Furumi | ............... | B60R 11/0211 |
| | | | | | | 381/86 |
| 9,270,318 | B2 | * | 2/2016 | Rassent | ............... | B60R 11/0241 |
| 9,457,760 | B1 | * | 10/2016 | Raines | ............... | B60R 21/045 |

FOREIGN PATENT DOCUMENTS

JP 202195084 A 6/2021

* cited by examiner

Primary Examiner — Pinel E Romain
(74) Attorney, Agent, or Firm — THE WEBB LAW FIRM

(57) ABSTRACT

A utility vehicle includes an open driver section including a driver's seat for a driver to sit on; a hermetically sealable space disposed in the driver section and having a door; and a terminal in the hermetically sealable space.

8 Claims, 4 Drawing Sheets

UTILITY VEHICLE

CROSS REFERENCE TO RELATED APPLICATION

The application claims priority to Japanese Patent Application No. 2021-156919, filed Sep. 27, 2021, the disclosure of which is hereby incorporated by reference in its entirety.

BACKGROUND OF THE INVENTION

Field of the Invention

The present invention relates to a utility vehicle (UV).

Description of Related Art

There have been utility vehicles suitable for off-road travel such as that disclosed in Japanese Unexamined Patent Application Publication, Tokukai, No. 2021-95084 (Patent Literature 1). Utility vehicles include a driver section including a ROPS for occupant protection and a seat. The driver section may further include various terminals such as a USB (Universal Serial Bus) terminal and a cigarette lighter socket. The terminals may each be provided with a cap for protection against dust and water.
Patent Literature 1: Japanese Unexamined Patent Application Publication, Tokukai, No. 2021-95084

SUMMARY OF THE INVENTION

Utility vehicles, which are designed for off-road travel, do not include a roof or a door, lacking a cabin space. This lets the driver section be easily exposed to rain water, earth, sand, and the like. Thus, providing a cap for a terminal does not necessarily prevent rain water and the like from entering the terminal to damage the terminal, rust the terminal, or cause the terminal to suffer from electric trouble.

The present invention has an object of protecting a terminal against rain water, earth, sand, and the like.

In order to attain the above object, a utility vehicle according to an embodiment of the present invention includes: an open driver section including a driver's seat for a driver to sit on; a hermetically sealable space disposed in the driver section and having a door; and a terminal in the hermetically sealable space.

A utility vehicle includes an open driver section having no cabin and incapable of preventing entry of wind, rain, earth, or sand. Providing a cap for a terminal in the driver section will thus normally fail to prevent some rain water, earth, or sand from reaching the terminal to rust or degrade the terminal.

With the above configuration, the utility vehicle includes a terminal in a hermetically sealable space in the driver section. The hermetically sealable space does not easily let in rain water, earth, sand, and the like. This reduces the risk of the terminal being influenced by rain water, earth, sand, or the like, and reliably protects the terminal against rain water, earth, sand, and the like.

The utility vehicle may be further arranged such that the terminal is connectable to a cable extendable from an inner wall of the hermetically sealable space in the hermetically sealable space, and the terminal is capable of being taken out of the hermetically sealable space while connected to the cable.

The above configuration allows the terminal to be protected in the hermetically sealable space against rain water, earth, sand, and the like when not in use and to be taken out of the hermetically sealable space for use. Thus, if a device connected with the terminal is difficult to use in the hermetically sealable space, the device is still usable outside the hermetically sealable space while connected with the terminal. The above configuration thereby allows the terminal to be used conveniently depending on the situation.

The utility vehicle may be further arranged such that the door has a notch and provided with an elastic member along an edge of the notch, and with the door closed and the terminal being outside the hermetically sealable space, the cable is in close contact with and held by the elastic member.

The above configuration allows the door of the hermetically sealable space to be closed while a device connected with the terminal is in use outside the hermetically sealable space. This can prevent rain water, earth, sand, and the like from entering the hermetically sealable space while the device is in use.

Further, the elastic member at the notch in the door is capable of being in contact with and holding the cable, preventing a gap from being formed between the edge of the notch and the cable. This can in turn prevent rain water, earth, sand, and the like from entering the hermetically sealable space through the notch.

The utility vehicle may be further arranged such that the door is on a driving panel faced by the driver on the driver's seat, and the hermetically sealable space is embedded in the driving panel.

The terminal is for use by the driver or an occupant on the passenger's seat in the driver section. The driving panel is in front of the driver and the occupant while the driver is driving the utility vehicle. The terminal being in the hermetically sealable space in such a driving panel means that the driver and the occupant use the terminal in the hermetically sealable space facing the driver and the occupant. This allows the driver and the occupant to easily use the terminal as compared to the case of a hermetically sealable space being so positioned in the driver section that it is not easily accessible to the driver and the occupant.

Further, the hermetically sealable space embedded in the driving panel will not be inconvenient for the driver or the occupant.

The utility vehicle may be further arranged such that the door is on a driving panel faced by the driver on the driver's seat, the hermetically sealable space is embedded in the driving panel, and the terminal is on an inner wall of the hermetically sealable space.

The above configuration allows the terminal to be easily disposed in the hermetically sealable space.

The utility vehicle may be further arranged such that the hermetically sealable space is off a center of a body of the utility vehicle in a width direction of the body, the width direction being orthogonal to a direction in which the utility vehicle travels, and the terminal is on an inner wall of the hermetically sealable space which inner wall is on a side toward the center.

The above configuration allows the terminal to be in the hermetically sealable space and away from a side portion of the body. This more reliably protects the terminal against rain water, earth, sand, and the like.

The utility vehicle may be further arranged such that the hermetically sealable space is a glove box.

Many utility vehicles have a glove box for storage of objects. Glove boxes usually include a door and have a hermetically sealable space inside.

Providing a terminal for an existing glove box having a hermetically sealable space allows the terminal to be in a hermetically sealable space without the need to additionally form a hermetically sealable space. This protects the terminal against rain water, earth, sand, and the like easily and appropriately.

The utility vehicle may be further arranged such that the terminal is a USB terminal.

The above configuration protects the USB terminal against rain water, earth, sand, and the like appropriately.

DESCRIPTION OF THE INVENTION

The description below deals with an embodiment of the present invention with reference to drawings. The description below refers to FIG. 1, which shows arrow F indicating the forward direction of the vehicle body and arrow B indicating the backward direction of the body. The left side relative to arrow F corresponds to the leftward direction of the body, whereas the right side relative to arrow F corresponds to the rightward direction of the body.

Overall Configuration of Utility Vehicle

Figure 1:
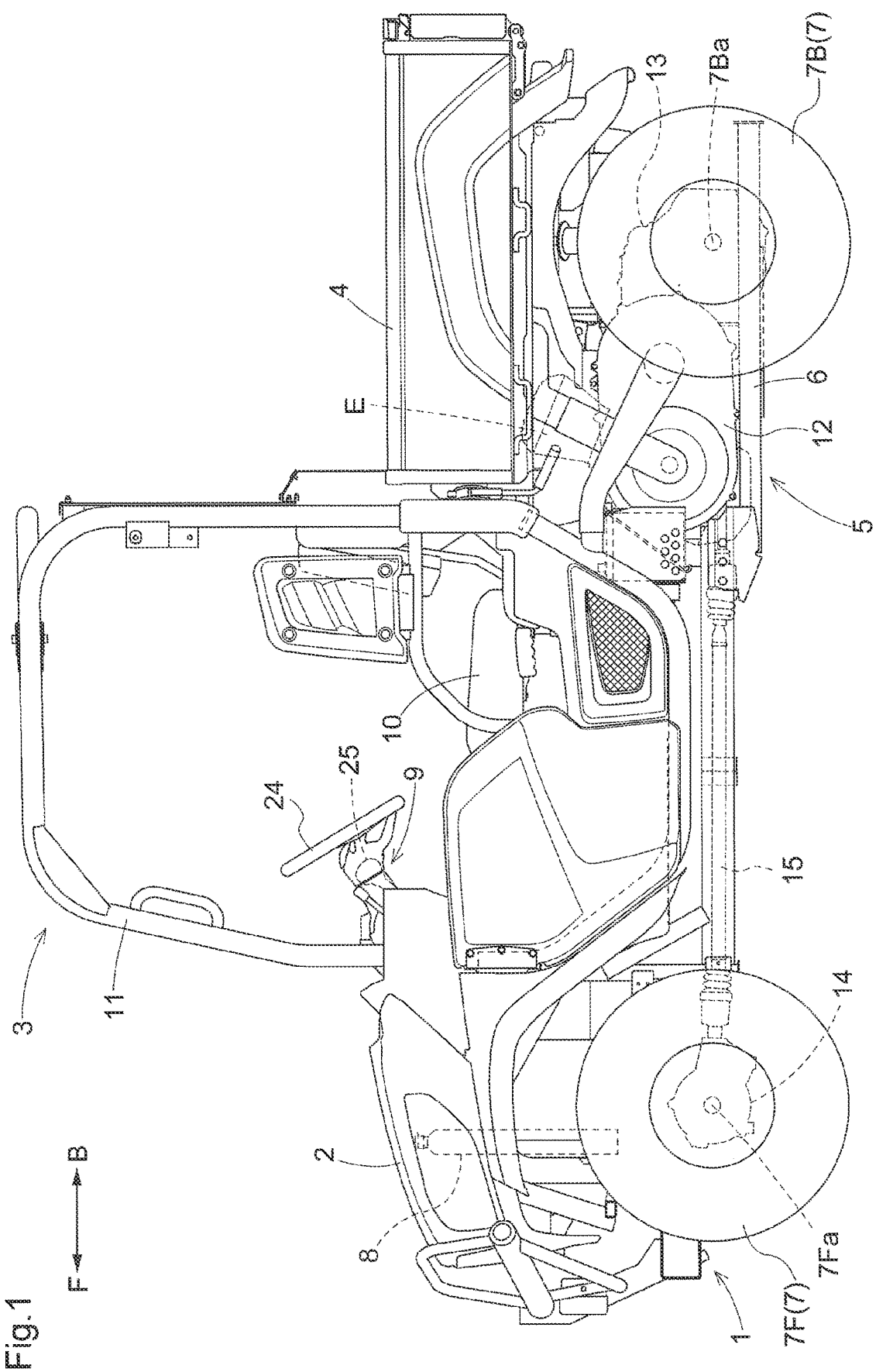
FIG. 1 is a left side view of a utility vehicle with an example configuration.

FIG. 1 illustrates the configuration of a utility vehicle according to an embodiment of the present invention. The utility vehicle includes a body 1, a hood 2, a driver section 3 for an occupant (driver) to get in, a dump-type carrier box 4, a water-cooling engine E, and a transmission section 5. The body 1 includes a body frame 6 and a travel device 7.

The travel device 7 includes left and right front wheels 7F drivable and capable of being turned and left and right rear wheels 7B drivable and incapable of being turned. The travel device 7 is switchable between a two-wheel drive mode, in which only the rear wheels 7B are driven, and a four-wheel drive mode, in which both the front wheels 7F and the rear wheels 7B are driven.

The hood 2 is forward of the driver section 3, and covers components such as a radiator 8 configured to cool cooling water for the engine E.

The driver section 3 includes a steering section 9 (which corresponds to the "driving panel"), a seat 10 (which corresponds to the "driver's seat"), and a ROPS 11 for occupant protection. The carrier box 4 is backward of the driver section 3. The engine E and the transmission section 5 are under the carrier box 4. The transmission section 5 is on a power transmission path along which the engine E transmits its motive power to the travel device 7. The transmission section 5 includes a belt-type continuously variable transmission device 12 and a transmission device 13. The continuously variable transmission device 12 is configured to continuously vary the motive power from the engine E.

The transmission device 13 is connected to left and right rear axles 7Ba, and is configured to transmit motive power thereto. The transmission device 13 transmits its motive power to the rear wheels 7B via the rear axles 7Ba. The transmission device 13 functions as a rear differential device.

The body 1 is provided with a front differential device 14 configured to transmit motive power from the transmission device 13 to the front wheels 7F. The body 1 is also provided with a power transmission shaft 15 extending from the transmission device 13 to the front differential device 14 and configured to transmit motive power from the transmission device 13 to the front differential device 14. The front differential device 14 is connected to left and right front axles 7Fa, and is configured to transmit motive power thereto. The front differential device 14 transmits its motive power to the front wheels 7F via the front axles 7Fa.

Steering Section

Figure 2:
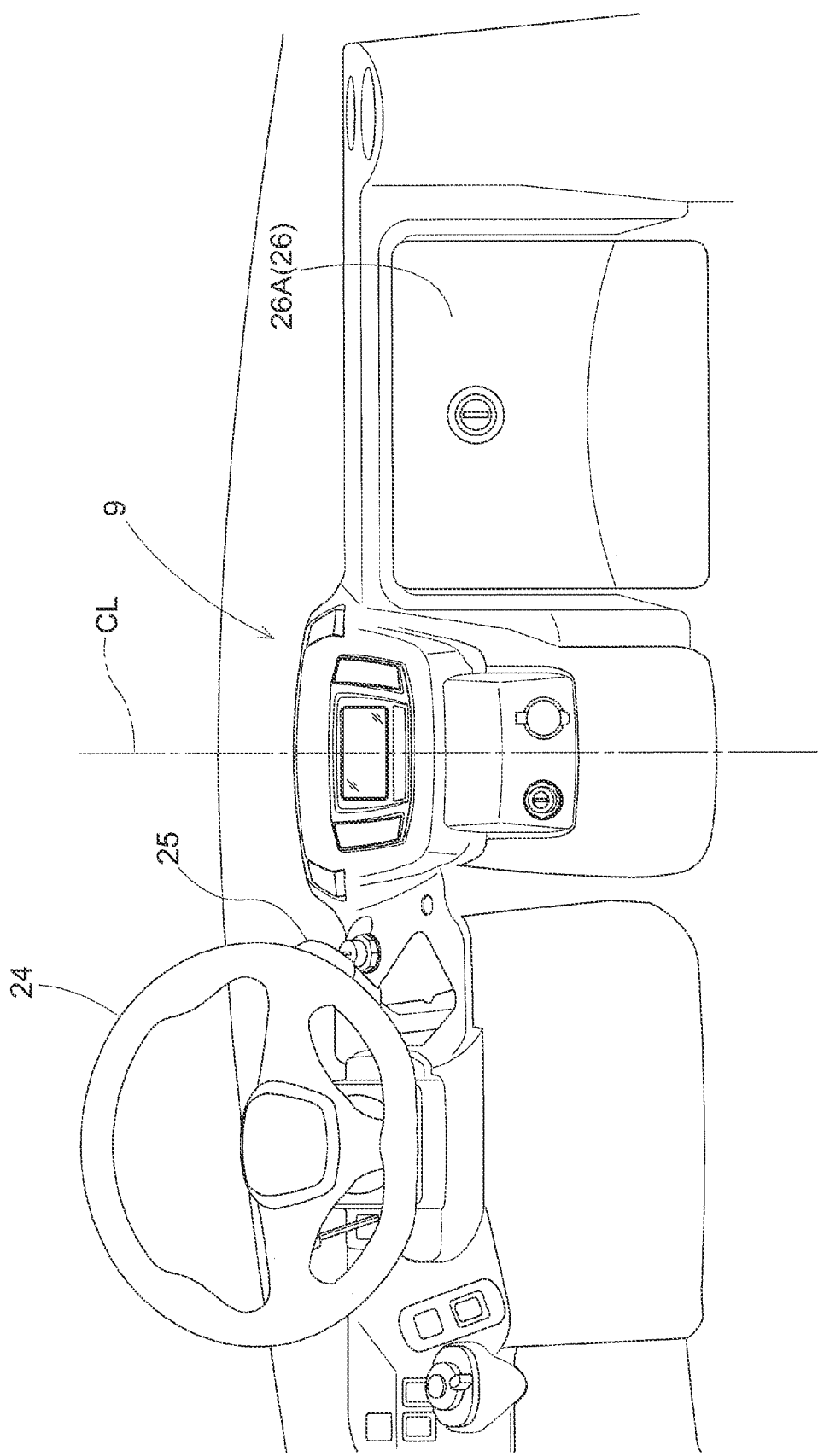
FIG. 2 is a rear view of a driving panel with an example configuration.

As illustrated in FIG. 2, the steering section 9 includes a steering wheel 24 for use to turn the front wheels 7F (see FIG. 1) and various operation tools such as a shift lever 25 for use to shift gears. The steering wheel 24 is in front of the seat 10 (see FIG. 1) for a driver (operator). The steering section 9 also includes a glove box 26 at a portion on the dashboard side at which portion the steering wheel 24 is not disposed.

USB Terminal

The glove box 26 is a hermetically sealable space embedded in the steering section 9, and includes a door 26A capable of being opened and closed. Closing the door 26A causes it to be flush with the outer surface of the steering section 9 and hermetically seals the space. Opening the door 26A causes it to protrude from the steering section 9. The glove box 26 is off the center line CL of the body 1 in the width (left-right) direction of the body 1, which is orthogonal to the direction in which the utility vehicle travels. Specifically, the glove box 26 is to the right of the center line CL, that is, on the side of the passenger's seat, while the steering wheel 24 is to the left of the center line CL, that is, on the side of the driver's seat.

Figure 3:
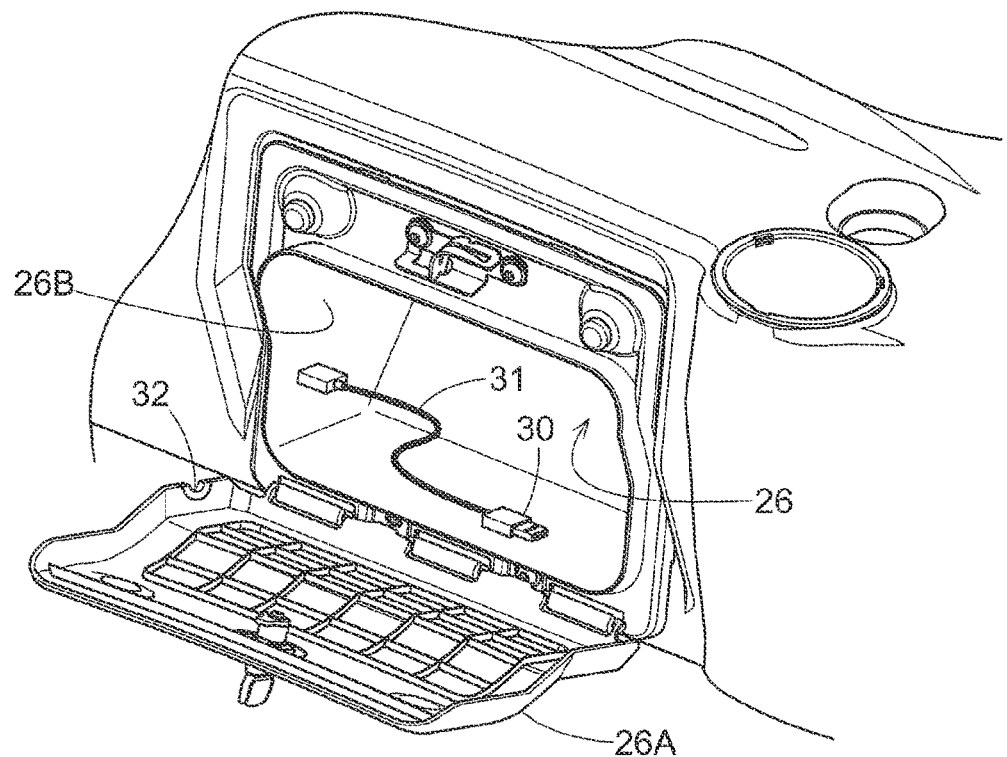
FIG. 3 is a view of a glove box, illustrating an example configuration of a terminal in the glove box.

As illustrated in FIG. 3, the glove box 26 contains a USB terminal 30 (which corresponds to the "terminal").

The glove box 26, which is a hermetically sealable space, does not easily let in rain water, earth, or sand. Containing the USB terminal 30 in the glove box 26 reduces the risk of rain water, earth, sand, dust, and the like reaching the USB terminal 30, thereby protecting the USB terminal 30 against rain water, earth, sand, and the like without use of a cap.

The USB terminal 30 may be at any position inside the glove box 26, and is, for example, provided for an inner side wall 26B (which corresponds to the "inner wall") of the glove box 26 on its left side (that is, on the side of the center line CL). Providing the USB terminal 30 for the inner side wall 26B allows the USB terminal 30 to be away from a lateral side portion of the body 1. This protects the USB terminal 30 more effectively against rain water, earth, sand, and the like entering the glove box 26 from a lateral side of the body 1. Providing the USB terminal 30 for an inner side wall of the glove box 26 on its right side (that is, on the side opposite to the center line CL) may not allow the driver to reach and use the USB terminal 30. Placing the USB terminal 30 near the driver (specifically, connecting the USB terminal 30 to the inner side wall 26B of the glove box 26 on its left side) allows the driver to easily use the USB terminal 30 while remaining on the seat 10 (that is, the driver's seat) as compared to the case of a USB terminal 30 being at a right-side portion of the glove box 26. The USB terminal 30 should preferably be provided for a portion of the inner side wall 26B which portion is near the door 26A to reduce the risk of the inner side wall 26B hindering the use of the USB terminal 30 (that is, the USB terminal 30 being invisible to the driver behind the inner side wall 26B and not easily reachable by the driver).

The USB terminal 30 is on a cable 31 extending from the inner side wall 26B of the glove box 26. The cable 31 is long enough for the USB terminal 30 to be outside the glove box 26. This allows a device connected with the USB terminal 30 to be used not only inside but also outside the glove box 26.

The cable 31 may be fixed to the inner side wall 26B of the glove box 26, or may alternatively be configured to be stored inside the steering section 9 behind the inner side wall 26B when not in use and drawn out from the inner side wall 26B for use. This alternative configuration allows the cable 31 to be disposed inside the glove box 26 in such a manner as not to hinder storage of an object in the glove box 26.

Figure 4:
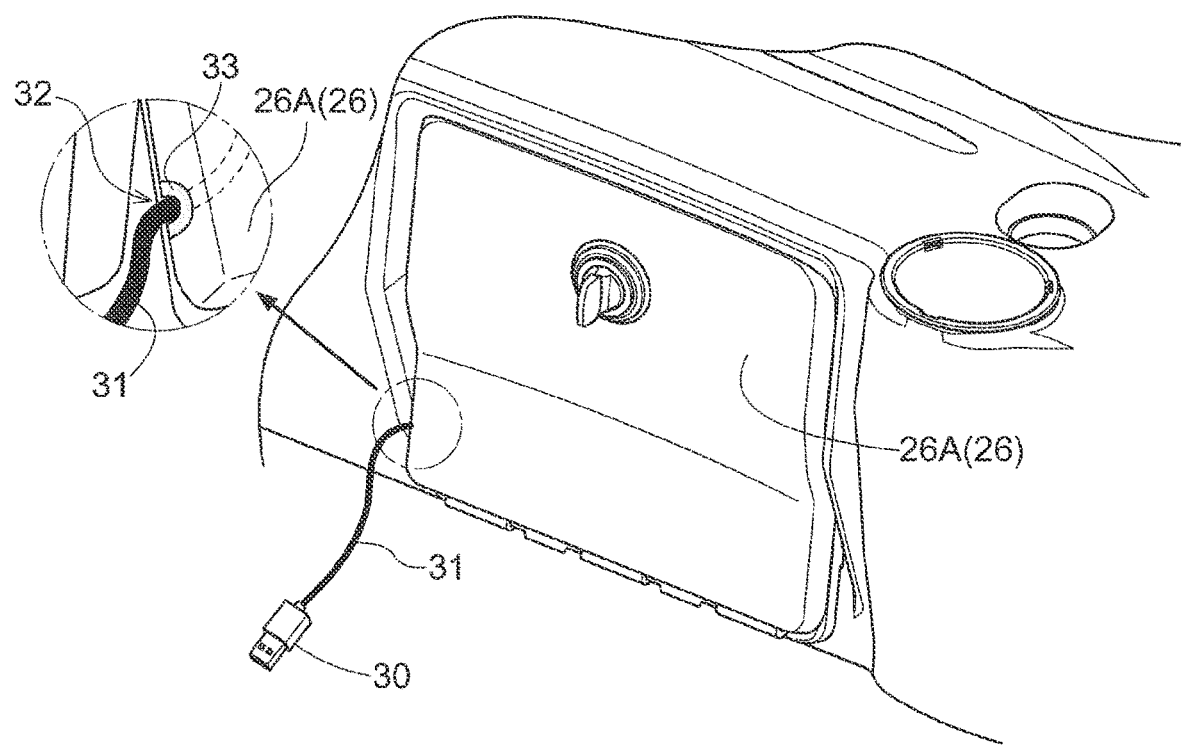
FIG. 4 is a view of a glove box, illustrating an example of how a terminal is disposed with the glove box door closed.

As illustrated in FIGS. 3 and 4, the door 26A of the glove box 26 should preferably have a notch 32. The notch 32 allows the cable 31 to extend therethrough with the door 26A closed when a device connected with the USB terminal 30 is used outside the glove box 26. Closing the door 26A of the glove box 26 can prevent rain water, earth, sand, and the like from entering the glove box 26 while the USB terminal 30 is in use.

The door 26A may be provided with an elastic member 33 made of, for example, rubber along the edge of the notch 32. The elastic member 33 allows the cable 31 to come into close contact with that portion of the door 26A which defines the notch 32 and to thereby be held by the door 26A stably. The elastic member 33 also prevents a gap from being formed between the cable 31 and that portion of the door 26A which defines the notch 32, and can thereby prevent rain water, earth, sand, and the like from entering the glove box 26 through the notch 32. Further, forming a notch 32 in a portion of the door 26A which portion is near the center line CL of the body 1 can prevent rain water, earth, sand, and the like from entering the glove box 26 from a lateral side of the body 1.

Figure 5:
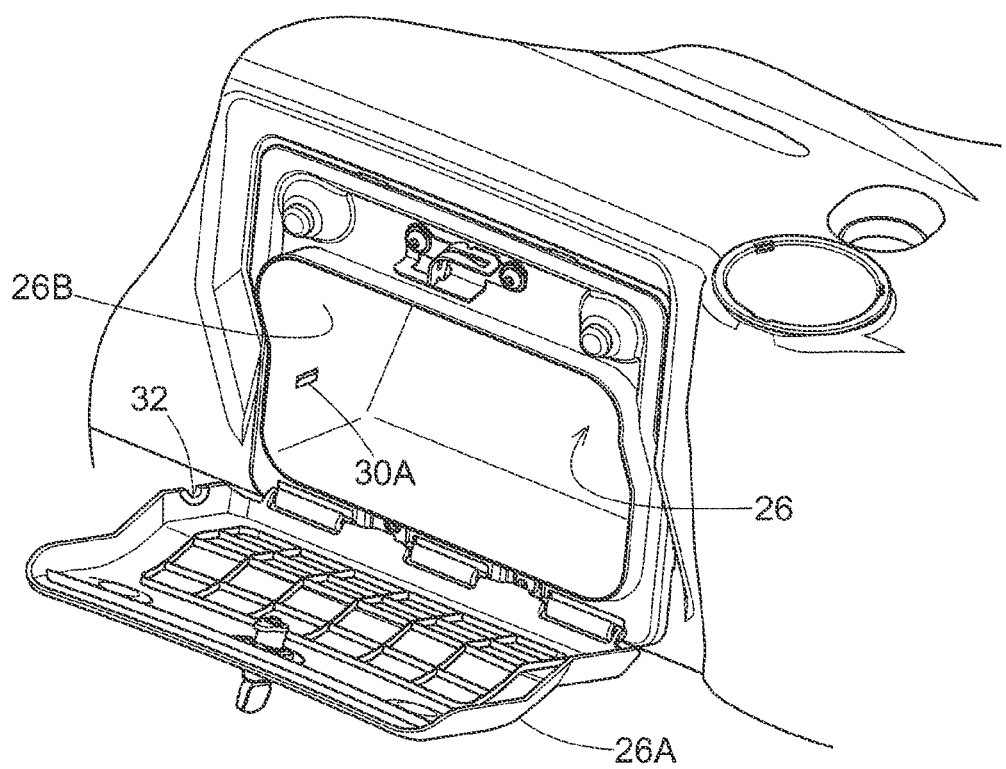
FIG. 5 is a view of a glove box for an alternative embodiment, illustrating an example configuration of a terminal in the glove box.

Alternative Embodiments (1) The embodiment described above may be altered such that the USB terminal 30 is disposed directly on an inner portion of the glove box 26, that is, without the cable 31 in-between. The embodiment may be altered, for instance, to include a USB terminal 30A on the inner side wall 26B of the glove box 26 as illustrated in FIG. 5.

This alternative embodiment includes a USB terminal 30A on an inner portion of the glove box 26, which is a hermetically sealable space that does not easily let in rain water, earth, sand, or the like. This simple configuration can protect the USB terminal 30A against rain water, earth, sand, and the like.

This alternative embodiment may be configured such that the cable 31 is detachably attachable to the USB terminal 30A on the inner side wall 26B. This allows the user to select depending on the situation between directly using the USB terminal 30A on the inner side wall 26B and drawing the cable 31 out of the glove box 26 to use the USB terminal 30.

This alternative embodiment is specifically configured such that the cable 31 has a first end provided with the USB terminal 30 and a second end provided with a connection terminal connectable to the USB terminal 30A. The cable 31, when used, is connected to the USB terminal 30A to allow the USB terminal 30 on the cable 31 to be usable.

The cable 31 being attachable and detachable as described above allows either of the USB terminals 30 and 30A to be used conveniently depending on the state of use of a desired device while appropriately protecting the USB terminals 30 and 30A.

(2) The embodiments described above may each be altered such that at least either of the USB terminals 30 and 30A is not in the glove box 26 but in another hermetically sealable space that is in the steering section 9 and that is capable of being opened and closed.

This alternative embodiment does not limit the respective positions of the USB terminals 30 and 30A, and allows the USB terminals 30 and 30A to be positioned for more convenient use.

This alternative embodiment may, for instance, have a hermetically sealable space near the seat 10 (driver's seat). In this case, providing the USB terminals 30 and 30A for an inner side wall of the hermetically sealable space which inner side wall is near the center line CL still more likely allows the driver to easily reach the USB terminals 30 and 30A than in the case of providing the USB terminals 30 and 30A for the inner side wall 26B of the glove box 26. This configuration reduces the possibility of an inner side wall of a hermetically sealable space hindering the driver's use of the USB terminals 30 and 30A, thereby allowing the driver to use the USB terminals 30 and 30A more easily while remaining on the seat 10 (driver's seat).

(3) The embodiments described above may each further include a terminal other than the USB terminals 30 and 30A such as a cigarette lighter socket in a hermetically sealable space such as the glove box 26 in addition to or instead of the USB terminals 30 and 30A.

INDUSTRIAL APPLICABILITY

The present invention is applicable to utility vehicles including a steering section that may be exposed to wind and rain.

REFERENCE SIGNS LIST

3 Driver section
9 Steering section (driving panel)
10 Seat (driver's seat)
26 Glove box (hermetically sealable space)
26A Door
26B Inner side wall (inner wall)
30 USB terminal
30A USB terminal
31 Cable
32 Notch
33 Elastic member
CL Center line of the body

The invention claimed is:
1. A utility vehicle, comprising:
an open driver section comprising a driver's seat;
a hermetically sealable space disposed in the driver section and comprising a door; and
a terminal in the hermetically sealable space.
2. The utility vehicle according to claim 1, wherein:
the terminal is connectable to a cable extendable from an inner wall of the hermetically sealable space in the hermetically sealable space, and
the terminal is capable of being taken out of the hermetically sealable space while connected to the cable.
3. The utility vehicle according to claim 2, wherein:
the door comprises a notch and is provided with an elastic member along an edge of the notch, and with the door closed and the terminal outside the hermetically sealable space, the cable is in close contact with and held by the elastic member.

4. The utility vehicle according to claim 1, wherein:
the door is on a driving panel faced by the driver on the driver's seat, and
the hermetically sealable space is embedded in the driving panel.

5. The utility vehicle according to claim 1, wherein:
the door is on a driving panel faced by the driver on the driver's seat,
the hermetically sealable space is embedded in the driving panel, and
the terminal is on an inner wall of the hermetically sealable space.

6. The utility vehicle according to claim 5, wherein:
the hermetically sealable space is off a center of a body of the utility vehicle in a width direction of the body, and the width direction is orthogonal to a direction in which the utility vehicle travels, and
the terminal is on an inner wall of the hermetically sealable space which inner wall is on a side toward the center.

7. The utility vehicle according to claim 1, wherein the hermetically sealable space is a glove box.

8. The utility vehicle according to claim 1, wherein the terminal is a USB terminal.

\* \* \* \* \*